United States Patent [19]

Eldridge

[11] 4,388,682

[45] Jun. 14, 1983

[54] MICROPROGRAMMABLE INSTRUCTION TRANSLATOR

[75] Inventor: David P. Eldridge, Acton, Mass.

[73] Assignee: Raytheon Company, Lexington, Mass.

[21] Appl. No.: 71,911

[22] Filed: Sep. 4, 1979

[51] Int. Cl.[3] .............................................. G06F 9/20
[52] U.S. Cl. .................................................. 364/200
[58] Field of Search ... 364/200 MS File, 900 MS File

[56] References Cited

U.S. PATENT DOCUMENTS

| 3,374,466 | 3/1968 | Hanf et al. | 364/200 |
| 3,394,350 | 6/1968 | Packard et al. | 364/200 |
| 3,739,352 | 6/1973 | Packard | 364/200 |
| 4,075,687 | 2/1978 | Nissen et al. | 364/200 |
| 4,103,329 | 7/1978 | Davis et al. | 364/200 |
| 4,159,520 | 6/1979 | Prioste | 364/200 |

Primary Examiner—Gareth D. Shaw
Assistant Examiner—John G. Mills
Attorney, Agent, or Firm—William R. Clark; Joseph D. Pannone

[57] ABSTRACT

An instruction translator which translates an instruction to a sequence of microinstruction addresses. The position and size of fields from the instruction translated into a particular next microinstruction address are determined by fields in the currently executing microinstruction. Different instruction sets may be executed by reprogramming the microinstructions.

8 Claims, 3 Drawing Figures

MICROPROGRAMMABLE INSTRUCTION TRANSLATOR

BACKGROUND OF THE INVENTION

In general, a computer program consists of a sequence of instructions all of which belong to a particular instruction set. At the appropriate time, each instruction is typically loaded into an instruction register where it resides while being decoded and executed. The execution of one instruction normally involves a plurality of steps. In many processors, each of these steps is performed by the execution of a microinstruction which may be stored in a read only memory. Accordingly, for these processors, a stage is required whereby a sequence of microinstruction memory addresses are provided for one instruction. In the prior art, this has been accomplished through the use of hardware logic that decodes the instruction. Commonly, each instruction is divided into a plurality of fields, each field consisting of a single bit or contiguous bits. Examples of fields are format, operation code, address mode, register specification, etc. The number, size, and types of fields may vary within one instruction set. Generally, the hardware decode logic determines the particular format from a delineation field within the instruction and then decodes the remainder of the instruction according to that format. However, when it is desirable to emulate a different processor using a different instruction set, different hardware decode logic is required.

SUMMARY OF THE INVENTION

The invention discloses the combination of means for storing a first digital instruction from a first set of instructions, a memory for storing second digital instructions from a second set of instructions, a register for storing a second digital instruction read out of the memory, means coupled to the storing means for providing a memory address to the memory wherein the providing means comprises means responsive to a first bit field of the contents of the register for determining the bit positions of bits from the first digital instruction provided in the memory address, means responsive to a second bit field of the contents of the register for determining the number of bits from the first digital instruction provided in the memory address, and means for transferring bits from a third bit field of the contents of the register into the memory address. The first digital instruction is generally referred to as a macroinstruction or a machine language instruction. The second digital instructions are commonly referred to as microinstructions, a sequence of which execute the machine language instruction. A bit field is defined as a single bit or a group of related bits that designate a particular function, mode, format, etc. It may be preferable that the storing means is an instruction register. Further, it may be preferable that the memory is a read only memory. Also, it may be preferable that the bit position determining means and bit number determining means comprise a plurality of selectors.

The invention may be practiced by a digital instruction translator for translating a digital instruction into a plurality of sequential microinstruction addresses which contain microinstructions, the combination of which execute the digital instruction, comprising a first register for storing a digital instruction to be executed, an addressable memory for storing a plurality of microinstructions, each microinstruction having at least first, second and third bit fields, a second register for storing a microinstruction read out of the memory, means coupled between the first and second registers for providing a memory address to the memory, said providing means comprising means responsive to the first bit field for altering the bit positions of bits from said digital instruction provided in the memory address, said providing means further comprising means responsive to said second bit field for altering the number of bits from the digital instruction transferred to said memory address and said providing means further comprising means for transferring bits from third field to said memory address.

BRIEF DESCRIPTION OF THE DRAWINGS

The foregoing and other objects and advantages will be understood more fully in the following detailed description thereof with respect to the accompanying drawings wherein.

DESCRIPTION OF PREFERRED EMBODIMENT

Figure 1:
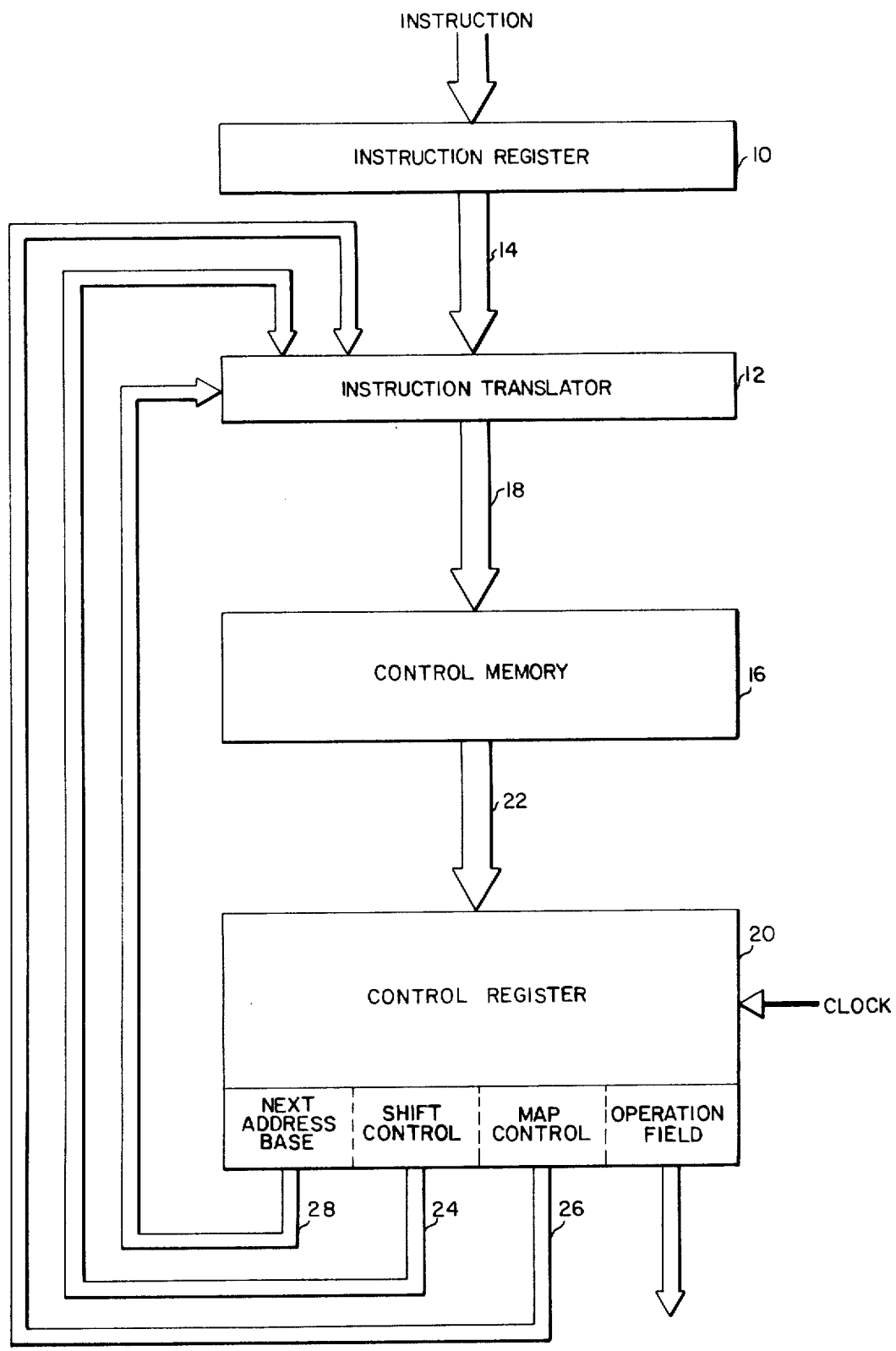
FIG. 1 is a schematic block diagram of a system embodying the invention.

Referring to FIG. 1, a schematic block diagram is shown which uses the invention to advantage. In operation, an instruction of a software program is loaded into conventional instruction register 10. In general, an instruction register contains the instruction which is being decoded and executed. Typically, input to an instruction register is from memory as the steps of a program are sequentially read from memory. In some computer systems, the instruction register can also be loaded from a set of switches or push buttons on the front panel; typically, this input method is used to direct the computer to the first location of the first program step. For an example given later herein, instruction register 10 contains storage for an 8-bit word. However, one skilled in the art will immediately understand that an instruction register of a different number of bits, such as, for example, 16, would also use the invention to advantage.

The output bits of instruction register 10 are connected to instruction translator 12 by lines 14, the configuration of which will be described in detail with reference to FIG. 2. Stated simply, the function of instruction translator 12 is to provide emulation processing wherein an instruction form a predetermined instruction set is translated into a sequence of appropriate microinstruction addresses which when executed comprise microprogram steps. An instruction set can be characterized as a set of words or instructions containing embedded information dictating operations to be performed by the processor. Conventionally, the embedded information is placed in fields within words, the fields being made up of contiguous bits. Examples of fields are format, operation code, address mode, register specification, etc. When a processor is designed for a specific instruction set, hardware logic is normally provided that decodes each instruction such that the control section of the processor provides appropriate timing pulses at the proper time to implement the individual steps of the instruction. This is accomplished even though the fields within an instruction set may vary in both bit length and relative position within an instruction word; typically, designated bits provide information that is used to determine how the instruction fields will be decoded. However, as stated in the background herein, when the processor is to emulate another processor and execute from another instruction set, different decode logic would generally be required. Instruction translator 12 provides a microprogrammable translational approach that extracts embedded information from instruction words and is generally adaptable to a plurality of instruction sets. The instruction translator 12 provides for emulation processing going directly from an instruction of a "foreign" instruction set directly to microprogram instructions. Instruction translator 12 will be described in detail with respect to FIG. 2 but for an understanding here, the inputs are an instruction from instruction register 10, shift control bits on lines 24 from control register 20, map control bits on lines 26 from control register 20, and next address base bits from control register 20 on lines 28. From these inputs in a process to be described later herein, instruction translator 12 sequentially provides microinstruction addresses to control memory 16 on lines 18.

Control memory 16 is a conventional type read-only memory (ROM) although any type of addressable memory providing the necessary storage capacity for the particular application could be used. Generally, the contents of control memory 16 are a plurality of microinstructions which when organized into appropriate sequences relate to a particular instruction of the instruction set of operation. If it is desirable for the system to emulate a different instruction set, the control memory can be reprogrammed with microinstructions for that particular instruction set. Examples of microinstruction sequences will be provided later herein.

The contents of a location in control memory 16 addressed by instruction translator 12 is clocked into control register 20. As stated earlier, the contents are microinstructions which are preprogrammed for a particular instruction set. Designated bits of control register 20 are connected as inputs to instruction translator 12. More specifically, on lines 24, three bits of shift control are connected to instruction translator 12. On lines 26, three bits of map control are connected to instruction translator 12. Also, on lines 28, six next address base bits are connected to instruction translator 12. The remaining bits of control register 20 are the operation field of the microinstruction which is executed according to well known theory. One skilled in the art will recognize that the number of bits described above is only one example of the preferred embodiment; in practice, the invention may be used to advantage with embodiments having different numbers of bits.

Figure 2:
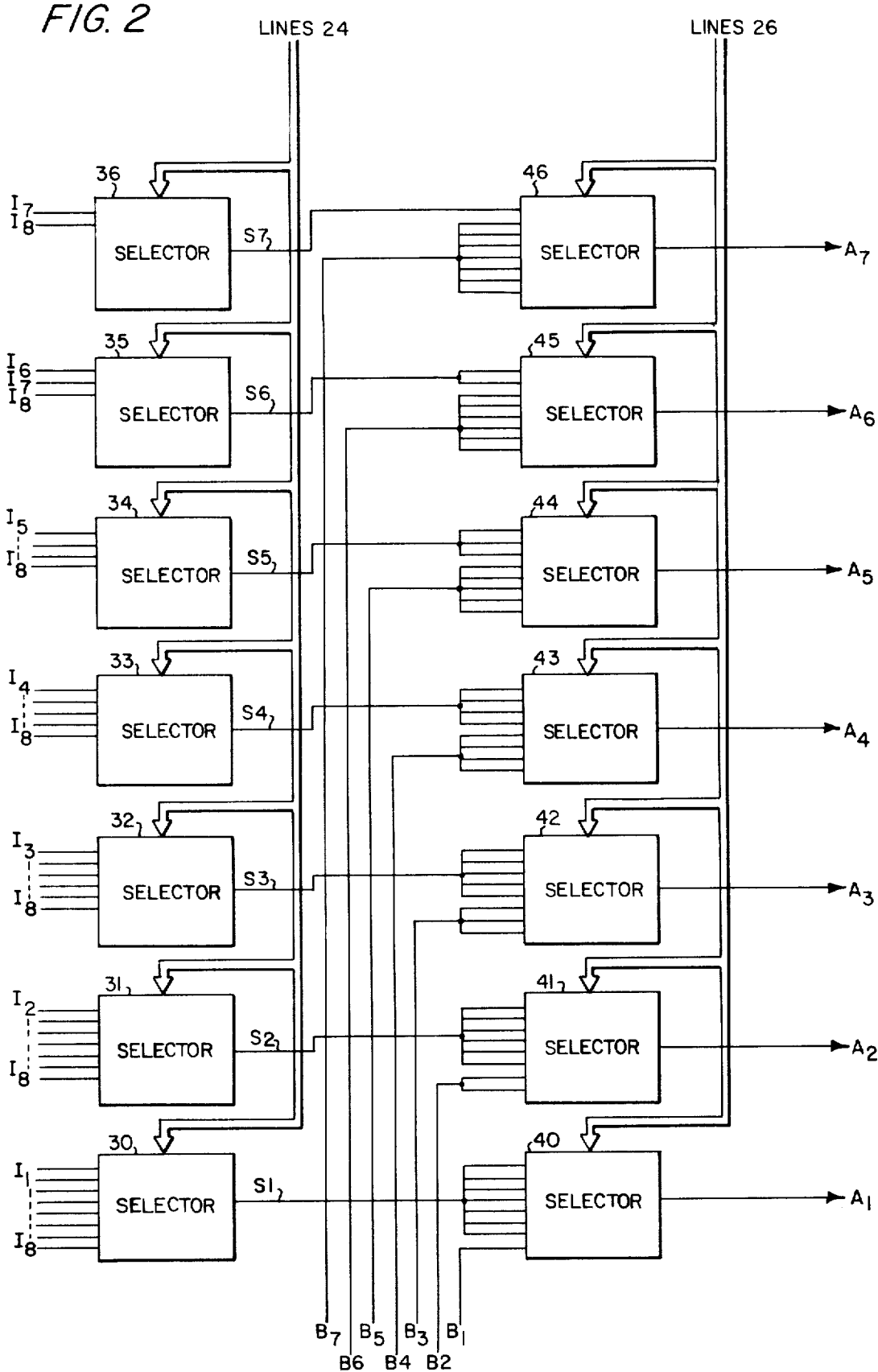
FIG. 2 is a detailed schematic diagram of the instruction translator of FIG. 1.

Referring to FIG. 2, a detailed schematic diagram of instruction translator 12 is shown. Conventional selectors 30-36 provide right justification or shifting of the instruction field to be translated. Three control lines 24 from control register 20 are connected to each selector of selectors 30-36. The shift control bits on these lines determine which bit of the eight input bits of each selector is transferred to the output. The input terminals of selectors 30-36 are connected as shown in FIG. 2. Specifically, selector 30 has eight inputs which are connected to the eight bits I1-I8 of instruction register 10 on lines 14; selector 31 has seven inputs which are connected to seven of the bits I2-I8 of instruction register 10 on lines 14; selector 32 has six inputs which are connected to six of the bits I3-I8 of instruction register 10 on lines 14; etc. In operation, when shift control bits of 000 are provided on lines 24, selector 30 transfers I1 to its output S1; selector 31 transfers I2 to its output S2; selector 32 transfers I3 to its output S3; etc. A summary of the outputs of selectors 30-36 for the various combinations of shift control bits is given below in Table 1.

TABLE 1

| Shift Control Bits (Lines 24) | Selector 30-36 Outputs | | | | | | |
|---|---|---|---|---|---|---|---|
| | S7 | S6 | S5 | S4 | S3 | S2 | S1 |
| 000 | I7 | I6 | I5 | I4 | I3 | I2 | I1 |
| 001 | I8 | I7 | I6 | I5 | I4 | I3 | I2 |
| 010 | X | I8 | I7 | I6 | I5 | I4 | I3 |
| 011 | X | X | I8 | I7 | I6 | I5 | I4 |
| 100 | X | X | X | I8 | I7 | I6 | I5 |
| 101 | X | X | X | X | I8 | I7 | I6 |
| 110 | X | X | X | X | X | I8 | I7 |
| 111 | X | X | X | X | X | X | I8 |

As can be seen from the S1 column in Table 1, any of the bits I1-I8 from instruction register 10 can be transferred into the output of selector 30 depending on the shift control bits provided on lines 24. In each one of the shift control bit rows as shown, the adjacent higher bits up to a maximum of I8 are provided in the sequential selector outputs S2-S7. In other words, in response to shift control bits on lines 24, contiguous bits up to I8 of the instruction register 10 are right justified to S1.

Selectors 40-46 provide the so-called map control function of the instruction translator 12. More specifically, the map control bits provided from control register 20 on lines 26 determine the number of bits in the instruction register field that are to be transferred to the output of instruction translator 12 to be part of the control memory 16 address A1-A7. The remaining bits of the seven bit control memory address are referred to as next address base bits B1-B7 and are provided on lines 28 from control register 20. A summary of the outputs of selectors 40-46 for the various combinations of map control bits is given below in Table 2.

TABLE 2

| Map Control Bits (Lines 26) | Selector 40-46 Outputs | | | | | | |
|---|---|---|---|---|---|---|---|
| | A7 | A6 | A5 | A4 | A3 | A2 | A1 |
| 000 | S7 | S6 | S5 | S4 | S3 | S2 | S1 |
| 001 | B7 | S6 | S5 | S4 | S3 | S2 | S1 |
| 010 | B7 | B6 | S5 | S4 | S3 | S2 | S1 |
| 011 | B7 | B6 | B5 | S4 | S3 | S2 | S1 |
| 100 | B7 | B6 | B5 | B4 | S3 | S2 | S1 |
| 101 | B7 | B6 | B5 | B4 | B3 | S2 | S1 |
| 110 | B7 | B6 | B5 | B4 | B3 | B2 | S1 |
| 111 | B7 | B6 | B5 | B4 | B3 | B2 | B1 |

As can be seen, the map control bits on lines 26 determine the number of instruction register bits to be included in a control memory 16 address A1-A7 on lines 18; as discussed earlier herein, however, the number of instruction register bits provided to selectors 40-46 may have been reduced from the original eight bits by selectors 30-36 as shown in Table 1. In summary, selectors 30-36 are used to right justify the field of interest in instruction register 10 and selectors 40-46 are used to define the number of bits in the field. The remaining bits A1-A7 in the address provided to control memory 16 on lines 18 are next address base bits B1-B7 on lines 28.

The foregoing description with reference to FIGS. 1 and 2 will be more easily understood with reference to the following example. Assume an eight bit instruction in instruction register 10 as shown below with bits I6, I5 and I4 identified as the field to be translated to a seven bit microinstruction address.

| I8 | I7 | I6 | I5 | I4 | I3 | I2 | I1 |

For this example, the shift control bits on lines 24 would be 011 as shown in Table 1 which would right justify the I4 bit. Because the field of interest is three bits, the map control bits on lines 26 would be 100 which, as shown in Table 2, would transfer S1 to A1, S2 to A2 and S3 to A3. Next address base bits B4 through B7 would be respectively transferred to A4 through A7 providing the following address:

| B7 | B6 | B5 | B4 | I6 | I5 | I4 |

Accordingly, instruction translator 12 of FIG. 2 used in the system shown in FIG. 1 can be used to translate a field of interest in an instruction from a predetermined instruction set into a microinstruction address.

The operation of the preferred embodiment of the invention and the programming of control memory 16 can best be understood with reference to an example of the execution of an instruction. Assume a two format instruction set as shown below.

| Format Delineation Field | Opcode Field | | | | Address Mode Field | | | |
|---|---|---|---|---|---|---|---|---|
| 0 | $0_3$ | $0_2$ | $0_1$ | $0_0$ | $A_2$ | $A_1$ | $A_0$ | Instruction Format 0 |
| I8 | | | | | | | | I1 |

| Format Delineation Field | Opcode Field | | | Data Field | | | | |
|---|---|---|---|---|---|---|---|---|
| 1 | $0_2$ | $0_1$ | $0_0$ | $D_3$ | $D_2$ | $D_1$ | $D_0$ | Instruction Format 1 |
| I8 | | | | | | | | I1 |

In instruction format 0, bits I1–I3 are the address mode fields, bits I4–I7 are the opcode field, and bit 8 is the format delineation field. In instruction format 1, bits I1–I4 are the data field, bits I5–I7 are the opcode field, and bit I8 is the format delineation field. For an example, the execution of an "add memory data to accumulator" instruction will be described and assume the instruction is given below,

| Format 0 | Add | | | Pointer Select | | |
|---|---|---|---|---|---|---|
| 0 | 1 | 0 | 1 | 1 | 0 | 1 | 0 |
| I8 | | | | | | | I1 | where I8 designates the format as format 0, 1011 is the opcode for an add, and 010 is the address mode for pointer select.

Figure 3:
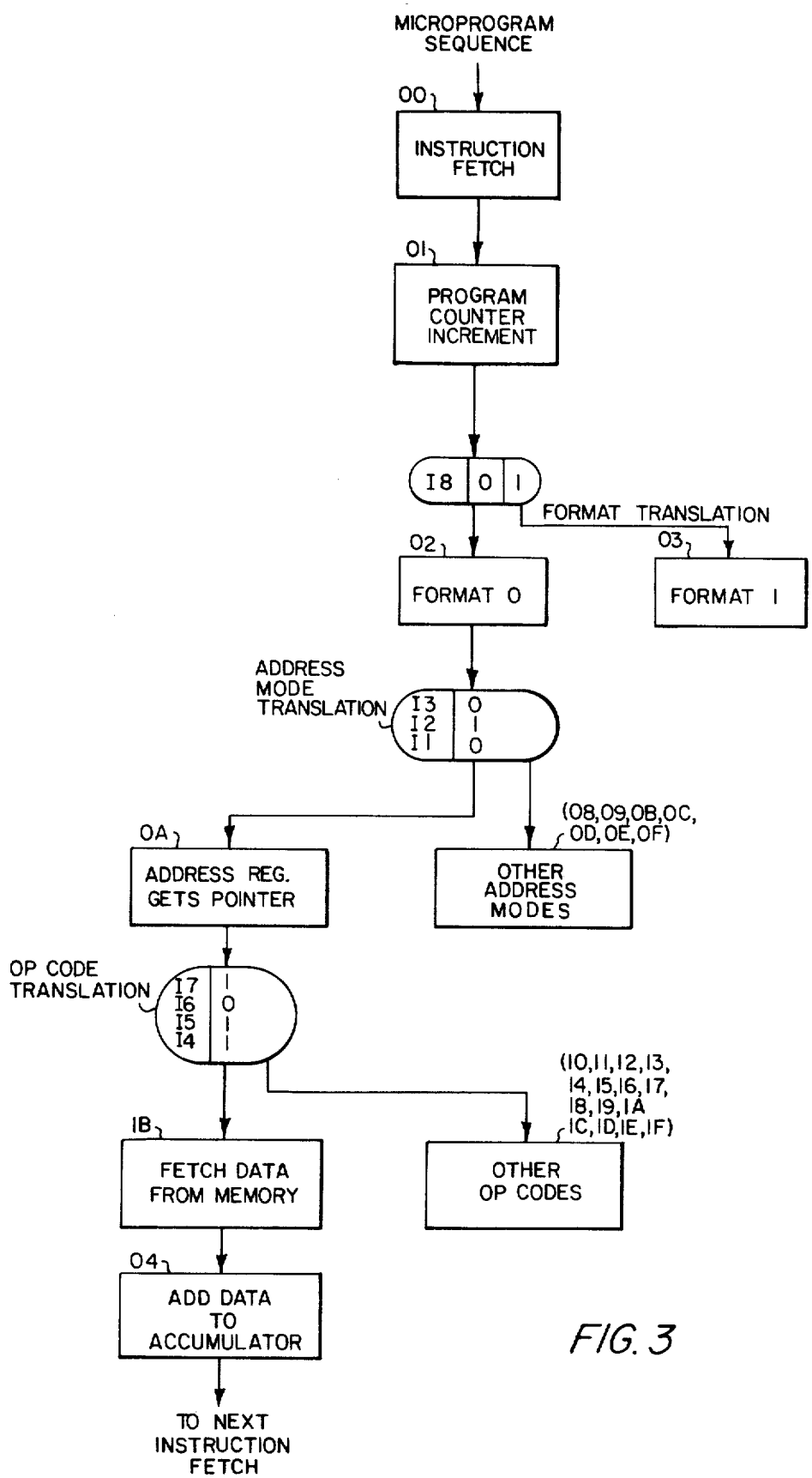
FIG. 3 is an example of a microprogram sequence.

Now referring to FIG. 3, the microprogram sequence for an "add memory data to accumulator" instruction is shown. More specifically, it is the microprogram sequence for the example given in the previous paragraph. The first step is instruction fetch which loads the instruction into instruction register 10. Next, the program counter is incremented. Following this, bit I8 which is the format delineation field, is examined to determine whether the instruction is format 0 or 1. For the example, the format is 0 so the address mode field (bits I1–I3) is translated and the address register gets pointer. Next, after the opcode field (bits I4–I7) is translated, data is fetched from memory. Following this, the data is added to the accumulator and the next instruction is fetched.

The concept of programming control memory 16 and the operation of instruction translator 12 is described with reference to the above example and the appendix. In the appendix, the microinstruction addresses are listed in the left hand column in the hexidecimal numbering system. Initially, as shown in FIG. 3 above the first microprogram step, control memory 16 location 00 is addressed with the next sequential step after the completion of a microprogram sequence such as shown. When location 00 is addressed, the contents are clocked into control register 20 of FIG. 1. The operation field is an instruction fetch which loads the example instruction 01011010 into instruction register 10. Referring to Table 2, the map control bits 111 cause the output of instruction translator 12 to be B7 B6 B5 B4 B3 B2 B1, regardless of the I bits in instruction register 10. As the next address base (B) bits are 0000001, the next location addressed in control memory 16 is location 01 which is clocked into control register 20. The operation field of location 01 is program counter increment which is the second step of the microprogram sequence of FIG. 3. The location 01 is indicated above the step in FIG. 3. Again, referring to Table 2, map control bits 110 cause the output of instruction translator 12 to be the control memory 16 address of B7 B6 B5 B4 B3 B2 S1 where S1, as a result of shift control bits 111 is I8. Accordingly, the address is 0000010 which is hexidecimal 02. The contents of location 02 are clocked into control register 20 which designates format 0 as the operation field. Had the format delineation field I8 of the instruction register been 1, the format translation would have gone to control memory location 03 as shown in FIG. 3. The map control field of location 02 is 100 so the next address provided by instruction translator 12 is B7 B6 B5 B4 S3 S2 S1. With the shift control bits 000, S3 S2 S1 are respectively I3 I2 I1. Accordingly, the control memory 14 address is 0001010 which is hexidecimal 0A. The contents of location 0A are clocked into control register 20 and the operation field of address register gets pointer (mode 2) is executed. As shown in FIG. 3, for different address mode fields, location 08, 09, 0B, 0C, 0D, 0E, and 0F would have been addressed. The map control field of location 0A is 011 so the next address provided by instruction translator 12 is B7 B6 B5 S4 S3 S2 S1. With the shift control bits 011, S4 S3 S2 S1 are respectively I7 I6 I5 I4. Accordingly, the address is 0011011 which is hexidecimal 1B. The contents of 01B are clocked into control register 20 and the fetch data from memory (opcode B) is executed. As shown in FIG. 3, for different opcodes, control memory 16 locations 10, 11, 12, 13, 14, 15, 16, 17, 18, 19, 1A, 1C, 1D, 1E or 1F could have been executed. The map control bits for location 1B are 111 which causes the address output of instruction translator 12 to be B7 B6 B5 B4 B3 B2 B1. Accordingly, the address is 0000100 which is hexidecimal 04. The contents of location 04 are clocked into control register 20 and the add data to accumulator operation field is executed. The map control bits of location 04 are 111 causing the address output of instruction translator 12 to be B7 B6 B5 B4 B3 B2 B1. Accordingly, the address is 0000000 which is hexidecimal 00. When location 00 is clocked into control register 20, the operation field instruction fetch is executed which initiates the execution of a new instruction and new microprogram sequence. The operation thus described utilizes fields in the microinstructions to control the translation of fields in the executing instruction to microinstruction addresses. The invention therefore provides a universal emulation approach wherein instructions are translated directly into microinstruction addresses; a different instruction set may be executed in the system by reprogramming control memory 16. Further, it is important to note that the control memory would have required reprogramming anyway to execute a different instruction set so as to provide new operation fields.

This completes the description of the preferred embodiment of the invention. Although a preferred embodiment has been described, it is believed that numerous modifications and alterations thereto would be apparent to one having ordinary skill in the art without departing from the spirit and scope of the invention. Therefore, it is intended that the scope of the invention be limited only by the claims.

APPENDIX

| | MICROINSTRUCTION | | | |
|---|---|---|---|---|
| | Instruction Translator Control | | | |
| Control Memory Address | Shift control | Map control | Next address base field B7 B6 B5 B4 B3 B2 B1 | Operation Field |
| 00 | 000 | 111 | 000 0001 | Instruction FETCH |
| 01 | 111 | 110 | 000 0010 | Program Counter Increment |
| 02 | 000 | 100 | 00 1000 | Format 0 |
| 03 | | | | Format 1 |
| 04 | 000 | 111 | 000 0000 | Add Data To Accumulator |
| 05 | | | | Unused |
| 06 | | | | Unused |
| 07 | | | | Unused |
| 08 | | | | Address Mode 0 |
| 09 | | | | Address Mode 1 |
| 0A | 011 | 011 | 001 0000 | Address Reg. Gets Pointer (Mode 2) |
| 0B | | | | Address Mode 3 |
| 0C | | | | Address Mode 4 |
| 0D | | | | Address Mode 5 |
| 0E | | | | Address Mode 6 |
| 0F | | | | Address Mode 7 |
| 10 | | | | OPCODE 0 |
| 11 | | | | 1 |
| 12 | | | | 2 |
| 13 | | | | 3 |
| 14 | | | | 4 |
| 15 | | | | 5 |
| 16 | | | | 6 |
| 17 | | | | 7 |
| 18 | | | | 8 |
| 19 | | | | 9 |
| 1A | | | | A |
| 1B | 000 | 111 | 000 0100 | FETCH DATA FROM ENTRY (OPCODE B) |
| 1C | | | | C |
| 1D | | | | D |
| 1E | | | | E |
| 1F | | | | F |
| . | | | | |
| . | | | | |
| . | | | | |
| . | | | | |

What is claimed is:

1. In combination:
   an instruction register for sequentially storing digital instructions during execution in a digital processor, each of said digital instructions corresponding to a sequence of microinstructions to be executed;
   an addressable memory for storing digital microinstructions constituting said sequences of microinstructions;
   a microinstruction register connected to the output of said addressable memory for sequentially storing said digital microinstructions after being read out of said memory and during execution;
   means coupled to said instruction and microinstruction registers for providing digital addresses to said addressable memory for reading said sequences of microinstructions out of said memory and sequentially into said microinstruction register for execution;
   said providing means comprising means for selecting a contiguous set of bits from the digital instruction resident in said instruction register for inclusion in one of said digital addresses wherein the number of bits in said selected set is determined by a first field of bits of the microinstruction resident in said microinstruction register and wherein the position in said resident instruction from which said set is selected is determined by a second field of bits of said resident microinstruction; and
   said providing means further comprising means for selecting bits from a third bit field of said resident microinstruction for inclusion in said one digital address.

2. The combination in accordance with claim 1 wherein said memory is a read only memory.

3. The combination in accordance with claim 2 wherein said selecting means comprises a plurality of parallel selectors.

4. In combination:
   a source of a digital instruction to be executed by the execution of a sequence of microinstructions;
   an addressable memory for storing microinstructions including said sequence of microinstructions, said microinstructions having at least first, second and third bit fields;
   a microinstruction register for storing one of said microinstructions during its execution, said one microinstruction having been read out of said addressable memory;
   means coupled between said source and said storing means for providing a digital address for reading a microinstruction out of said memory and into said microinstruction register;
   said providing means comprising means for selecting a contiguous set of bits from said digital instruction for inclusion in said digital address, said selecting means being responsive to said first bit field for determining the bit position of said digital instruction at which said selected set starts;
   said including means further comprising means responsive to said second bit field for determining the number of bits in said selected set; and
   said providing means further comprising means for selecting bits from said third bit field for inclusion in said digital address.

5. The combination in accordance with claim 4 wherein said source comprises an instruction register.

6. The combination in accordance with claim 5 wherein said storing means comprises a register.

7. The combination in accordance with claim 6 wherein said memory is a read only memory.

8. The combination in accordance with claim 6 wherein said selecting means comprises a plurality of parallel selectors.

* * * * *